United States Patent [19]
Shiomi et al.

[11] Patent Number: 4,694,305
[45] Date of Patent: Sep. 15, 1987

[54] MULTI-COLORED STACKED CASSETTES THERMAL PRINTER

[75] Inventors: Kengo Shiomi, Tokyo; Yoshiyuki Sasaki, Chofu; Toshiyuki Kato, Tokyo, all of Japan

[73] Assignee: Tokyo Juki Industrial Co., Ltd., Tokyo, Japan

[21] Appl. No.: 846,590

[22] Filed: Mar. 31, 1986

[30] Foreign Application Priority Data

Mar. 30, 1985 [JP] Japan .................................. 60-67574
Mar. 30, 1985 [JP] Japan .................................. 60-67575

[51] Int. Cl.4 ......................... G01D 15/10; B41J 35/14
[52] U.S. Cl. ................................ 346/76 PH; 400/120; 400/206; 400/208.1; 400/216.1
[58] Field of Search ................... 346/76 PH; 400/120, 400/208.1, 208, 212, 214, 206, 216.1

[56] References Cited

U.S. PATENT DOCUMENTS 4,030,588 6/1977 Hanagata et al. .................... 400/120
4,469,459 9/1984 Trezise et al. ..................... 400/216.1
4,504,160 3/1985 Payne et al. ...................... 400/196.1

*Primary Examiner*—E. A. Goldberg
*Assistant Examiner*—Gerald E. Preston
*Attorney, Agent, or Firm*—Louis E. Marn

[57] ABSTRACT

The present invention relates to polychromatic thermal printer of transferring type designed to print with any color selected from monochromic colors and mixed colors on a recording medium by arranging printably on said recording medium a plurality of ink ribbons having different colors to each other and received in a plurality of different cassette ribbons and by actuating selected thermal head from a plurality of thermal heads incorporating a plurality of separated heaters capable to be actuated selectively.

7 Claims, 7 Drawing Figures

MULTI-COLORED STACKED CASSETTES THERMAL PRINTER

BACKGROUND OF THE INVENTION (1) Field of the Invention

The present invention relates to a thermal printer comprising a plurality of separately divided thermal heads each having a heater and a plurality of cassette ribbons incorporating each differently colored ink ribbon correspondingly to each thermal head and thermal printers for recording informations such as letters images, etc. on a printing medium by actuating selectively said heaters incorporated in a plurality of the thermal heads, more particularly to a multi-colored thermal printer for recording informations by arranging linearly 4 cassette ribbons incorporating 4 thermal heads and 4 cassette ribbons incorporating each independently 4 colored ribbon comprising black, cyan, magenta and yellow ribbons on a carriages in series to the conveying direction of recording medium.

(2) Description of the Prior Art

Conventional thermal printers have, in general, each a thermal head incorporating a plurality of heaters comprising thermally insulated semiconductors, etc. on a base board and the heaters are driven so as to heat said thermal heads by a certain information pattern and the thermal head is displaced after the completion of one print to print the subsequent information. Such a type issues low noise due to its absence of impact and characterized by a simple mechanism and low price, but since heat-sensitive paper should be employed as its recording medium, the running costs are higher.

There have been developed recorder which is free from impact by displacing ink ribbon prepared by coating lowmelting ink capable to be molten by heat in the form of film having a thickness of several microns to dozens microns on a substrate sandwiched between the recording medium and the thermal head relatively to the thermal head incorporating heater for heating said thermal head and which uses no heat-sensitive paper as the recording medium.

Under such a situation Published Japanese Patent Application No. 45969/1983 has proposed a multi-colored thermal printer comprising a plurality of thermal heads incorporating a plurality of separated heaters and a plurality of platens each corresponding to said plurality of separated heaters to feed the recording medium by the rotation of platens engaed frictionally with the recording medium and to convey successively the recording medium to each corresponding thermal head, said platens being driven by engaging frictionally against the outer peripheral surfaces of rotating rolls driven at a predetermined r.p.m. Further Published Japanese Patent Application No. 115279/1981 has proposed a multi-colored recorder of transference type which comprises plurality of ink layer-forming media installed spacedly each in a predetermined distance so as to be contacted with the recording medium conveyed through paper-feed rollers and recorder for transferring the image to the recording medium through a plurality of thermal heads. Furthermore, Published Japanese Patent Application Nos. 7390/1983 and 203084/1983 disclose color printers wherein one ink ribbon has a plurality of longitudinal color strips and at least one thermal head for each color is provided confrontedly to each color strip and the recording information is divided into each color to be fed to the corresponding thermal head(s).

Since conventional colored themal printer of serially transferring type have structures as indicated above, they have various disadvantages of complicated structure, high maintenance costs for exchanging the rink ribbons, high cost due to the large-sized printers, etc.

The printers as disclosed hereinbefore and claimed in Published Japanese Patent Application Nos. 7390/1983 and 203084/1983 have economical disadvantage that since the black, cyan, magenta and yellow inks are coated on the same ribbon, unnecessary colored strips are also conveyed together with the used colored strips to increase the running costs of ribbon.

SIMPLE ABSTRACT OF THE DESCRIPTION

The present invention has been invented so as to solve distadantages of such conventional printers. According to this invention a plurality of cassette ribbons incorporating each independently black, cyan, magent and yellow ink ribbon are arranged in parallel to the conveying direction of recording medium and a plurality of thermal heads incorporating a plurality of independently separated heaters capable to be energized selectively correspondingly to these cassette ribbons.

It is a main object of this invention to provide a multicolored thermal printer of transferring typeconstructed so that the printing actuator having a driving source for energizing it during the printing on one line by the printing signal is interlocked with plunger for pushing the thermal heads provided separately to said plurality of cassette ribbons and ends of a plurality of roller blocks having each engaging member arranged in confronted relation with the ink ribbons to effect the printing and feeding and taking-up of plurality of ink ribbons.

SIMPLE DESCRIPTION OF THE DRAWING

DETAILED DESCRIPTION OF THE INVENTION

Figure 1:
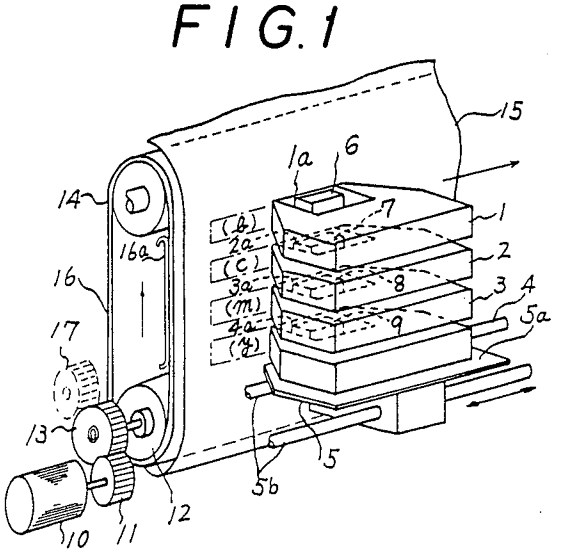
FIG. 1 is a schematic perspective view of a multicolored thermal printer of transferring type accoding to this invention.

A preferred embodiment of this invention will be illustrated hereinafter with reference to the attached drawings wherein the same structures are represented by the same numerals.

Numerals 1,2,3,4 represent cassette ribbons which incorporate respectively black ink ribbon 1*a*, cyan ink ribbon 2*a*, magent ink ribbon 3*a* and yellow ink ribbon 4*a*. These ink ribbons comprise Mylar films (Mylar being a trade name of polyethylene terephthalate) having a thickness of several microns to several tens microns and coated with ink layers which are solid at room temperature but turned to fluidal or viscous liquid upon heating.

Such ink films have relatively higher melting point, of say, about 100° C. If the environmental temperature is assumed to be ranged from about 40° C. to 50° C. when the printer is driven, it is undesirable that the ink films are softened at such an environmental temperature to foul the feed mechanisms etc. for the recording paper. It is also essential to minimize the thickness of films so as to shorten the melting and cooling times of ink films. The ink ribbons as specified hereinabove record no mark on the recording medium by the close contact with the recording medium to apply a pressure thereagainst and assure the recording only upon the heating.

Numeral 5 represents a carriage. A heap of cassette ribbons 1,2,3,4 are mounted on base plate 5*a* of carriage 5 and support members are provided perpendicularly to the cassette ribbons. The support members are attached with 4 rotable heat sinks within the spaces of cassette ribbon 1,2,3,4. Said plurality of heat sinks are attached with thermal heads 6,6,7,9 each in confronted relation with ink ribbons 1*a*, 2*a*, 3*a*, 4*a*. Carriage 5 is provided with a pair of slidable rods 5*b* fixed to side plates (not shown) at the both sides thereof. Numeral 10 represents a stepping motor. Gear 11 fixed around the shaft of motor 10 is meshed with gear 13 fixed to the shaft of first platen 12. A belt 16 is installed between first platen 12 and second platen 14 for conveying printing medium 15 (referred hereinafter as cut paper) to the direction of indicated arrow. The shafts of first platen 11 and second platen 14 are supported rotatably to the side plates (not shown).

Numeral 17 represents a gear meshed with gear 13 fixed around the shaft of first platen 12. There is provided with a cut paper supplier driven by a follower gear (not shown) meshed with gear 17 for feeding cut paper 15 to the direction of first platen 12.

A recording medium feeder for cut paper is composed of stepping motor 10, gears 11, 13, first platen 12, second platen 14, belt 16, etc. By the way, numeral 16*a* represents a counter plate for belt 16 which is prepared by coating an elastic material such as rubber or felt on a substrate plate and fixed to the side plate (not shown).

Figure 2:
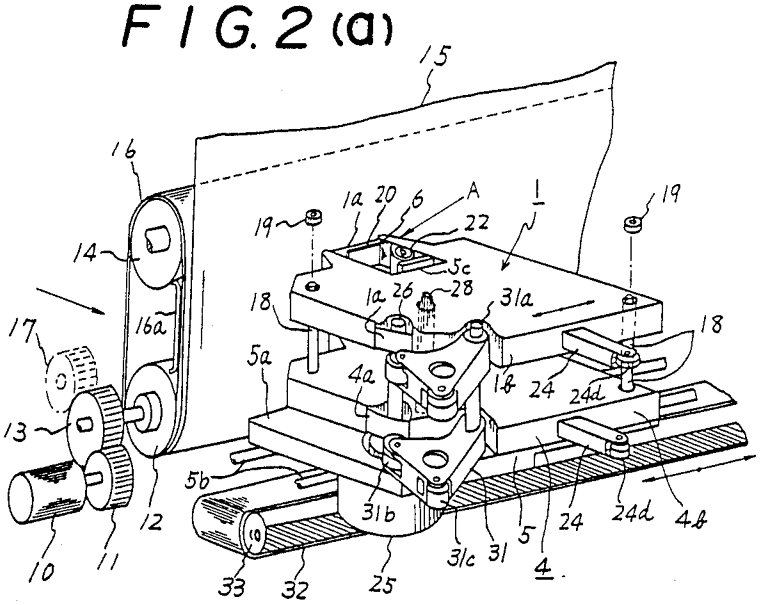
FIG. 2(*a*) is a perspective view of an enbodiment of this invention FIG. 2(*b*) is a schematic view at the neighbor of thermal heads, taken from the direction of A in FIG. 2(*a*) and FIG. 2(*c*) is a perspective view of driving mechanism for feeding the ink ribbon.
Figure 2B:
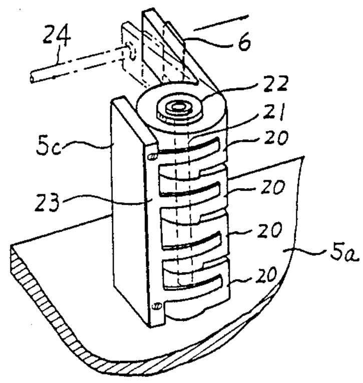
Figure 2C:
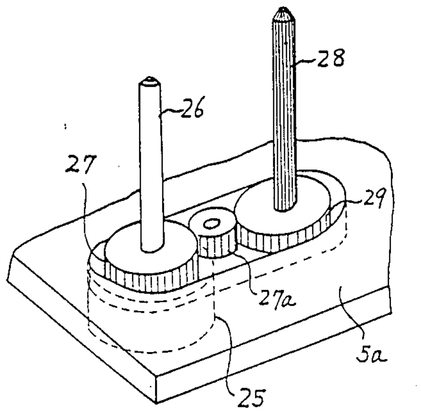

FIGS. 2(*a*) 2(*b*) and 2(*c*) are perspective views for illustrating the structure as shown in FIG. 1. In FIG. 2(*a*) cassette ribons 1,2,3,4 (casette ribbons 2, 3 being omitted for convenience) are piled together by being guided by guide rolls 18 protruded from base plate 5*a* of carriage 5 and fixed detachably to the conveying direction of cut paper 15 by fastening nuts 19 through the threaded top ends of guid rods 18. Thermal head 6,7,8,9 are made of a plurality of heater (normally 24 heaters arranged in a vertical row) prepared from semiconductor such as silicone semiconductor (not shown) and ceramic suppooter plate (not shown) and these heads are attached to heat sink 20 made of heat-conductive material such as aluminum for radiating the heat liberated from the heaters. FIG. 2(*b*) is a perspective view taken from direction (A) in FIG. 2(*a*) for showing the attachments at the neighbour of thermal heads 6,7,8,9. Numeral 21 is a supporter member provided at the base plate 5*a* of carriage 5 for supporting rotatably heat sinks 20 and the top end of supporter member is fixed by fastening nut 22 via washer.

Numeral 5C represents a vertical wall protruded from base plate 5*a* of carriage 5 and elastic member 23 comprising 4 leaf springs is fixed on one side face of vertical wall 5*c* by means of screws or the like. The 4 leaf spring of elastic member 23 press constantly the side surfaces of 4 heat sinks 20 with an elastic force substantially smaller than the compression force to the printing direction by plunger 24 for pushing the thermal heads but slightly rotatably counter-clockwise. By the way in FIG. 2(*b*), the position as shwon by chain-lines shows that the plunger 24 for pushing the thermal heads is released and the position as shown by solid-lines shows that the plunger is in the printing position.

Namely when the thermal head 6 is in the printing position by pressing thermal head 6 by plunger 24 for pushing the thermal head elastic member 23 acts so that the elastic force is applied slightly larger and when plunger 24 for pushing the thermal head is released elastic member acts so as to be restored to the releasing position.

In FIGS. 2(*a*) and 3, numeral 24 represents the plunger for pushing the thermal head which is supported reciprocally movably to side wall partions 1*b* of cassette ribbon 1 and provided with damper 24*b* comprising press member 24*a* and an elastic member and return spring 24C between both side wall portions 1*b* and end portion 24*d* at another end.

Said plungers 24 are attached similarly to cassette ribbons 2,3,4 and arranged so as to be confronted respectively to thermal heads, 7,8,9.

Driving source (referred to hereinafter as stepping motor) 25 is attached on the bottom surface of base plate 5*a* of carriage 5 and ink ribbon feeding shaft 26 is provided with rotating shaft of stepping motor 25 for guiding ink ribbons 1*a*, 2*a*, 3*a*, 4*a* in cassette ribbon 1,2,3,4 so that each end of ink ribbon is not substantially abutted with the vicinal end of another ink ribbon.

As shown in FIG. 2(*c*), ink-ribbon feeding shaft 26 is provided with gear 27 which is designed so as to be meshed with gear 29 attached fixedly ribbon-taking-up shaft 28 supported rotably by base plate 5*a* of the carriage through intermediate gear 27*a*. Ribbon-taking-up shaft 28 is indented with longitudinal grooves so as to be engaged resiliently with take-up spool 30 made of a plastic resin or the like. (See FIG. 3.). An ink ribbon feeding mechanism is composed of driving source 25, ink ribbon-feeding shaft 26, gears 27, 27*a*, ribbon-taking-up shaft 28, etc.

Numeral 31 represents roller block which comprises light alloy such as aluminum alloy and provided with a central hole for reducing the weight thereof and attached rotatably to roller block shaft 31*a* protruded from base plate 5*a* of carriage 5. The roller block is provided with portion 31*b* for engaging the roller block with the base plate and end portion 31*c* at 2 points of its periphery. Roller blocks 31 are provided in correspondence with ink ribbons 1*a*, 2*a*, 3*a*, 4*a* in cassette ribbons 1, 2, 3, 4 and portions 31*b* for engaging the roller blocks with the base plate are provided so as to be confronted with ink ribbon feeding shaft 26 via ink ribbons 1*a*, 2*a*, 3*a*, 4*a* and end portions 31*c* of the roller blocks are provided so as to be confronted with printing rod of printer means as will be referred hereinafter.

Numeral 32 represents a timing belt which is driven by the pulley (not shown) of the stepping motor and rotated through guide pulley 33 to the direction perpendicular to the conveying direction of cut paper 15 (the direction as shown by the arrow). Timing belt 32 is allowed carriage 5 to displace to the direction perpendicular to the conveying direction of cut paper 15 as shown by the arrow through a coupling memeber (not shown) mounted on the bottom portion of base plate 5*a* of carriage 5.

Figure 3:
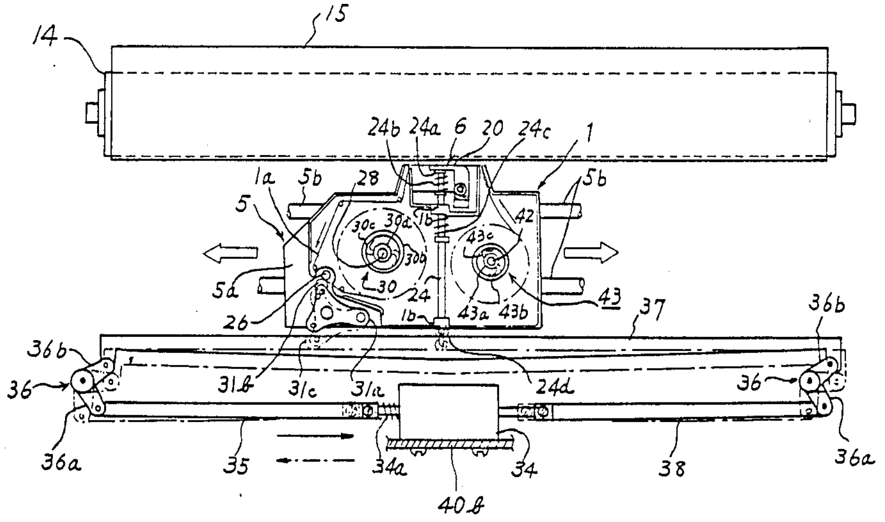
FIG. 3 is a plan view of the printer according to this invention.
Figure 4:
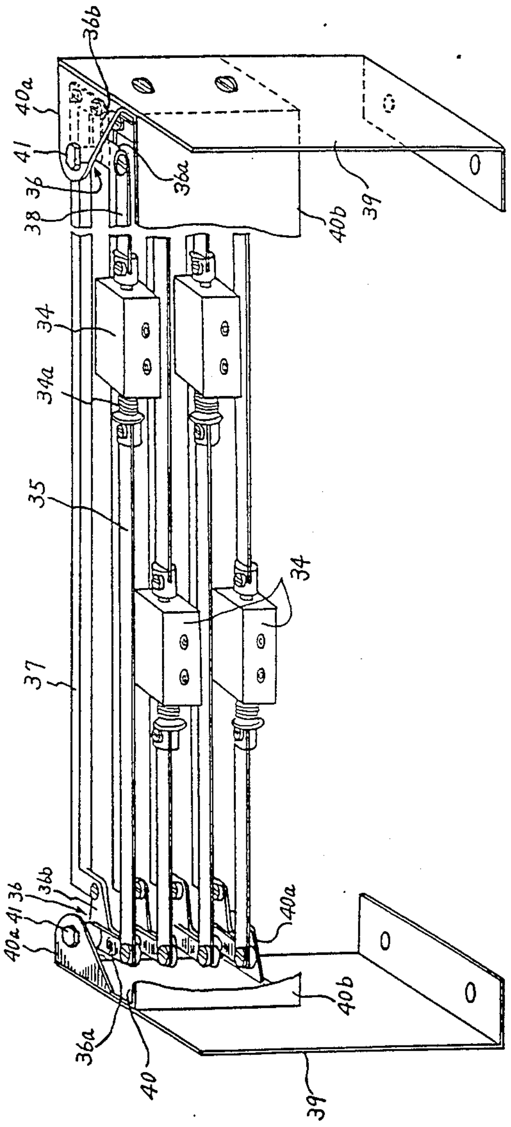
FIG. 4 illustrates a perspective view of printing actuator.

Here will be now set forth printing means for interlocking plunger 24 for pushing the above-mentioned thermal heads and roller blocks 31 with reference to the perspective views in FIGS. 3 and 4. Numeral 34 is a latch solenoid incorporating coil and latch member. Latch solenoid 34 is coupled with inter-locking rod 35 at the left end of the solenoid through a compression spring 34*a* and the left end of inter-locking rod 35 is coupled with arm 36*a* of left forked link having arms 36*a*, 36*b* extending substantially perpendicularly to each other. Printing actuator rod 37 is coupled with arm 36*b* of left forked link 36 at the left end of rod 37 and with arm 36*b* of the right forked link 36. A connecting rod 38 is coupled with arm 36*b* of right forked link 36 at the right end of rod 38 and with latch solenoid 34 at the left end of rod 38. A printing actuator is composed of latch solenoid 34, compression spring 34*a*, interlocking rod 35, left forked link 36, printing actuator rod 37, right forked link 36, connecting rod 38, etc.

There are provided 4 sets of such printing actuators. When latch solenoid is not excited, the longitudinal side surface of printing actuator rod 37 is confronted to end portion 24*d* of plunger 24 for pushing thermal heads for each cassette ribbons 1, 2, 3, 4 provided on base plate 5*a* of carriage 5 as shown in above-mentioned FIG. 2(*a*) and end portions 31*c* of 4 roller blocks 31. In other words, numeral 39 represents a pair of side plates provided at the both sides and the side plates are attached fixedly supporter members 40 composed of top and bottom flanges 40*a* and front strip 40*b* for connecting both side plates 39. Between these flanges 40*a*, there are secured fixedly rotating shaft 41 supporting rotably the central portions of each 4 forked links 36 on each side plate. Said strip 40*b* is attached fixedly with 4 latch solenoids 34.

Figure 5:
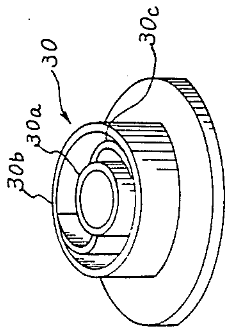
FIG. 5 is a perspective view of takingup spool according to this invention.

On the other hand, in FIG. 3, numeral 42 represents guide shaft protruded from the bottom of cassette ribbons 1 upwards and inner wheels 43*a* of feed spools 43 wound the end portions of new ink ribbons 1*a*, are fitted loosely and rotatably around said guide shaft 42. Each inner wheel 43*a* of feed spool 43 is provided with a pair of blades 43*c* so that the tips of blades 43*c* rub slightly and contacted slidably with outer wheel 43*b* for facilitating the feed of ink ribbon 1*a* from feed spool 43. Said ink ribbons 1*a* are passed through the front of thermal heads 6, guided through pins or the like and taken up to take-up spools 30 as shown in the perspective view of FIG. 5 and engaged resiliently through ribbon take-up shaft 28. In FIG. 5, numeral 30*a* represent an inner wheel, numeral 30*b* an outer wheel and numeral 30*c* a pair of blades attached to inner wheel 30*a* and the tips of blades rub slightly and contact slidably with outer wheel 30*b* to tak up ink ribbon 1*a*.

Take-up spool 30 and feed spool 43 and the like are arranged similarly for cassette ribbons 2, 3, 4.

In operation of multi-coloured transfer recording system having such mechanisms, stepping motor 10 is driven and cut paper 15 fed from cut paper feeder means(not shown) through gears 11, 13, 17 is conveyed on belt 16 driven by rotating first platen 12 and set in the printing position. In in FIGS. 2(*a*), 3 and 4, ink ribbons 1*a* of cassette ribbons 1 are confronted with cut paper 15 at the printing position apart to a minor distance. Accordinly, a carriage motor (not shown) is actuated, ink ribbons 1*a* is guided by sliding rods 5*b* through timing belt 32 to be conveyed to the left printing postion together with carriage 5 without abutting with cut paper 15.

When latch solenoid 34 are excited by the information signal for starting the printing, its plunger compresses compression spring 34*a* to be attracted to right direction (the direction indicated by the solid arrow in FIG. 3) to interconnect interlocking rods 35, 38 and to rotate right and left forked links 36 counterclockwise to displace printing actuater (34*a*, 35, 36, 37, 38) from the non-excited position as shown by the chain-lined position in FIG. 3 to the excited position as shown by the solid-lined position in FIG. 3 and latch latch solenoid 34.

Consequently, the side surface of printing actuating rod 37 presses end 24*d* of plunger 24 for pushing the thermal head and end portion 31*c* of roller block 31 by the mechanical displacement.

As a result, plunger 24 for pushing the thermal head compresses return spring 24*c* so that press member 24*a* is abutted to the inner side of heat sink 20 and plunger 24 compresses also damper 24*b* to push heat sink 20 so that thermal head 6 is abutted correctly to cut paper 15. On the other hand, roller block 31 is rotated clockwise around roller block shaft 31*a* and portion 31*b* for engaging the roller block abutts against ink ribbon 1*a* , so that ink ribbon 1*a* is friction rotated to the direction of take-up spool 30 and wound around spool 30 in corporation with ink ribbon feeding shaft driven by stepping motor constantly during the printing operation.

Concurrently with said steps, the heater is energized for about 10 to 20 mS through flexible wire (not shown) so as thermal head 6 is heated by the printing information pattern, the surface temperature of heater is heated to about 200° C.

The temperature of heater is transmitted through ink ribbon 1*a* to cut paper 15 to transfer the ink in the form of a letter or pattern and after the completion of printing of the letter or pattern, thermal head 6 is displaced to the next position for printing the subsequent information. On the other hand, the portion including spent portion of ink ribbon 1 is taken up around take-up spool 30 in corporation with ink ribbon feeding shaft 26 and portion 31*b* for engaging the roller block so that the fresh portion of ink ribbon 1*a* , is fed to the direction of thermal head 6 by the rotation of feed spool 43 induced by the taking-up tension of take-up spool 30. After the termination of printing for one line, the latch mechanism for latch solenoid 34 in the printing actuator is released by the information signal to restore the printing actuator (34*a*, 35, 36, 37, 38) to the non-exciting position as shown by chained lines. Consequently, plunger 24 for pushing the thermal head and roller block 31 are released. Plunger 24 for pushing the thermal head is restored to the orignal position by the resilient force of return spring 24*c* and thermal head 6 is separated from cut paper 15. In addition. roller block 31 is rotated counterclockwise around roller block shaft 31*a* by the resilient force by the leaf spring or the like (not shown) so that the cooporation of ink ribbon feeding shaft 26 and portion 31 or engaging the roller block is released to stop the feeding of ink ribbon. Then the stepping motor (not shown) is driven to displace carriage 5 to the printing position at the leftward second position through timing belt 32 for repeating the printing operation on the second line.

The printings with cyan ink (c) relating to cassette ribbon 2 with magenta ink (m) relating to cessette ribbon 3 and with yellow ink (y) relating to cassete ribbon 4 are carried out similarly to the above-mentioned printing with black ink (b) relating to cassette ribbon 1. Mixed colors can be printed by registering two inks so that red color is provided by registering the yellow ink and magent ink, violet color by registering the magent ink and cyan ink and green color by registering the yellow ink and cyan ink.

Consequently, monocolored letters and patterns as well as seven colors letters and patterns can be printed by only one horizontal displacement of thermal heads 6,7,8,0. In short, when a green point is to be printed, a yellow point is printed and then cyan point is printed on the same yellow point. So that when the seven colors are to be printed in any order on one line, the printing can be achieved by only one displacement of the thermal head.

In addition, the four thermal heads correspond to the ribbons having the same colors, so that there arises no trouble that the ink ribbons are mixed together through such thermal heads. When mono-colors by ink ribbons 1*a* , 2*a*, 3*a*, 4*a* and mixed colors are to be concurrently printed, the printing speed is higher by 4 times than that for conventional systems and may be said to be improved markedly over conventional system in view of the combinations of two colors.

Furthermore, the cassette ribbons are exchangeable and each ink ribbon is taken up onyl during the printing operation so that the present printer is advantageous in the maintenance costs and running costs.

It should be noticed that although 4 printing actuators (34, 34*a*, 35, 36, 37, 38) have been set forth, the printer may be composed of one printing actuator, and the printing actuator may be composed of linear motor, servomotor or other motor.

In the above description, the ink ribbon mechanisms and each thermal head 6, 7, 8, 9 are attached to carriage 5. However, it may be possible to attach them each of plurality of cassete ribbons 1,2,3,4 as disclosed hereinafter. Namely, in the ink ribbon mechanisms, stepping motors 25 are replaced by small-sized solenoids and latch portions are provided on the plungers so as to rotate ink ribbon feeding shafts 26 and ribbon taking-up shafts 28 by cooperating gears and these members are attached to each of cassette ribbons 1,2,3,4, respectively. In addition, a plurality of thermal heads, 6,7,8,9 are actuated by actuating printing actuators attaching printing actuators comprising small sized solenoids and link mechanisms to plungers 24 for pusshing the thermal heads. Accordingly, the feeding of ink ribbons and the printing can be carried out by actuating the printing actuators comprising such ink ribbon feeding mechanisms and thermal heads and attached to each of plurality of cassette ribbons 1, 2, 3, 4.

Accoding to the above mentioned embodiment of this invention, a pularity of thermal heads incorporating a plurality of separated heaters and cassette ribbons 1, 2, 3, 4 incorporating a plurality of multicolored ink ribbons are provided independently and correspondingly on a carriage and cassette ribbons 1,2,3,4 are arranged linearly to the conveying direction of cut paper 15 on first platen 12 and second platen 14. In addition, the printer is designed so that the printing actuators actuated by the printing signal during the printing on one line are interconnected with the plungers for pushing the thermal heads and with the end portions of plural roller blocks arranged on the carriages to effect the printing, takin-up of ink ribbons and feeding of ink ribbons. Thus the present printer can solve the problems of complicated structure, maintenance for interchanging of ink ribbons, cost-up by the large sized printer, etc. as encountered in conventional printers and it is effective in the compact structure due to the intensiveness, easy maintenance, low noise and high printing speed. In addition, carriage motors or stepping motors have been employed as other driving sources such as the feeding of ink ribbons in conventional printers. According the the present invention, the expensive carriage motors can reduces the capacities easily thanks to the provision of inexpensive printing actuators for the driving of the thermal heads and for the feeding of ink ribbons.

It is also important that since ink ribbons required for the printing are consumed exclusively to eliminate the useless consumption of ink ribbons, the running cost of ink ribbons is reduced drastically with high economical advantage.

What is claimed is:

1. A multi-chromatic thermal printer which comprises:

recording substrate supply means for introducing a recording substrate into an image receiving position of said thermal printer;

a carriage means for laterally traversing said recording substrate;

a plurality of ribbon cassette members positioned in vertical array on said carraige means, each of said ribbon cassette members having an ink ribbon disposed for contact with sasid recording substrate, said ribbon formed with a pigment-containing material;

a plurality of thermal head members positioned on said carriage means for selectively cooperating with a ribbon cassette member of said plurality of ribbon cassette members, each of said thermal head members being capable of being heated in image-wise pattern; and transfer means for cooperating with said plurality of thermal head members to thereby heat said respective ribbon in said image-wise pattern and to transfer said thus heated pattern onto said recording substrate.

2. The thermal printer as defined in claim 1 wherein each ribbon is formed of a different pigment-containing material.

3. The thermal printer as defined in claim 1 and further including ribbon feed means for selectively indexing said ribbon in each of said plurality of ribbon cassette members in response to image transfer onto said recording substrate.

4. The thermal printer as defined in claim 3 wherein said ribbon feed means includes a shaft driven by a stepping drive assembly and a roller member, said roller member cooperating with said shaft to capture and to incrementally index forward said ribbon within a ribbon cassette member.

5. The thermal printer as defined in claim 4 wherein said ribbon cassette includes a ribbon supply spool and a ribbon take-up spool and wherein said ribbon feed means includes a shaft driven by said stepping drive assembly to rotate said take-up spool in response to incremental indexing forward of said ribbon.

6. The thermal printer as defined in claim 5 and further including an actuator drive assembly for selectively actuating said transfer means and said ribbon feed means associate with respective ribbon cassette members.

7. A multi-colored thermal printer of transferring type characterized by providing a recording medium conveyed to one direction by means of a recording medium-feeder, a carriage displaceable to the direction perpendicular to the conveying direction of said recording medium, a plurality of cassette ribbons arranged detachably in parallel to the conveying direction of said recording medium on said carriage and each provided with a take-up spool and feed spool, a plurality of ink ribbon feed mechanisms each provided with an ink ribbon feed shaft driven by a driving power source attached fixedly to said carriage and a common ribbon taking-up shaft fitting freely the plurality of cassette ribbons, a plurality of thermal heads each having a separated heater arranged in confronted relation with each ink ribbon in each cassette, ribbon, a plurality of plungers for pushing each thermal head extending to the direction perpendicular to the conveying direction of the recording medium through each cassette ribbon and attached in confronted relation with each thermal head, a plurality of roller blocks each supported rotatably through each roller block shaft provided in each carriage and each having an engaging portion arranged in confronted relation with each ink ribbon, and a plurality of printing actuator each arranged in confronted relation with ends of each plunger for pushing thermal head and each roller block and each having a driving power source, so that only when said recording medium is to be printed, said printing actuator is interconnected with said plunger for pushing the thermal head and end portion of said roller block to effect the printing and the feeding of said ink ribbon in cooperation with said ink ribbon feed shaft and said engaging portion of roller block and the taking-up of the ink ribbon around a taking-up spool and the feeding through a feeding spool.

* * * * *